United States Patent [19]
Simonsen

[11] 3,901,611
[45] Aug. 26, 1975

[54] CONNECTOR

[75] Inventor: Ole Finn Simonsen, Baie d'Urfe, Canada

[73] Assignee: Dominion Bridge Company, Ltd., Canada

[22] Filed: Oct. 15, 1973

[21] Appl. No.: 406,322

[30] Foreign Application Priority Data
July 18, 1973 Canada.................................. 176750

[52] U.S. Cl. ................. 403/187; 211/177; 403/232
[51] Int. Cl.² ............................................ F16B 9/02
[58] Field of Search .......... 403/230, 245, 187, 199, 403/232; 211/182, 176, 177; 182/179

[56] References Cited
UNITED STATES PATENTS
| | | | |
|---|---|---|---|
| 3,031,088 | 4/1962 | Ribbens et al. | 211/182 |
| 3,195,735 | 7/1965 | Jay | 403/49 |
| 3,556,306 | 1/1971 | Shell | 211/182 |
| 3,642,146 | 2/1972 | Frazier | 211/176 |

FOREIGN PATENTS OR APPLICATIONS
| | | | |
|---|---|---|---|
| 258,554 | 12/1967 | Austria | 182/179 |
| 1,378,230 | 10/1964 | France | 211/182 |

Primary Examiner—Werner H. Schroeder
Assistant Examiner—Wayne L. Shedd
Attorney, Agent, or Firm—Larson, Taylor and Hinds

[57] ABSTRACT

A connector is disclosed for use in assembling load carrying members in frameworks for buildings and the like. Although connectors have been known in the past, they have been too expensive or have been unacceptable because of fabricating tolerances. The present connector is economic to produce, is formed in two parts which may be joined to the appropriate beam or column before leaving the assembly shop. The connector has a first connector plate having at least one hook with a first portion extending outwards from the first plate and a second portion extending substantially parallel to the first plate. A second connector plate is provided with at least one aperture adequate in size for admitting the hook, the second plate being adequate in thickness for the first portion of the hook to contact one edge of the aperture and allow the second portion of the hook to overlap the edge of the aperture.

5 Claims, 11 Drawing Figures

PATENTED AUG 26 1975

CONNECTOR

This invention relates to a connector for use in assembling frameworks for buildings and the like. More particularly, the invention relates to a connector for attachment to prefabricated sections to permit assembly in the field of a framework for buildings and the like.

In the construction industry today there is a trend to fabricate as much as possible in the fabricating shop before a building or the like is erected in the field. This is particularly true for a building having a structural steel frame, in which traditionally the sections are cut to length and prepared in a shop, shipped to an erection site and then assembled by means of rivets, high strength bolting or field welding. Very little riveting is carried out today so most of the field connections incorporate bolting or welding. Thus there is clearly a need for a connector today, the parts of which may be assembled to a beam or column in a fabricating shop before being shipped to the erection site.

Many types of connectors have been suggested in the past for connecting beams to columns, beams to beams, for connecting wooden beams to columns and even in some cases, concrete beams to columns. None of these have been completely acceptable however, primarily due to the cost of the connectors but also due to the problem of tolerance that arises in the fabricating shop. The tolerance has been such that when the beam or column reaches the field it does not always fit together as it is supposed to do. Consequently, time has to be spent by the construction crew assembling the beam or column in its correct location. Nowadays, however, new methods of fabricating structural steel using more accurate assembly lines, in some cases tape controlled, allow beams and columns to be fabricated to much closer tolerances. Hence it is now feasible to have a connector which has one half attached to the end of a beam and the other half attached to the surface of a column.

Similar types of connectors shown in previous patents have generally been made from castings or forgings, thus are expensive to fabricate and generally require to be bolted or riveted to a structural member rather than be welded.

It is an object of the present invention to provide a connector suitable for attachment by welding to beams and columns in a fabricating shop thus avoiding welding, bolting or riveting in the field.

It is a further object of the present invention to provide a connector having two connector plates which may each be formed in long lengths and cut to length to suit the capacity required, the final length of both connector plates being equal.

A still further object of the present invention is to provide a connector suitable for connecting a steel member to a steel member, a concrete member to a concrete member, a wood member to a wood member or connecting one type of member to another.

With these and other objects in view, there is provided in a skeleton framework for buildings and the like, the improvement of a connector assembly for joining two load carrying members together, comprising in combination, a first connector plate adapted for attachment to one load carrying member, at least one hook formed from an elongated flap in the first plate, the hook having a first portion extending outwards from the first plate and a second portion extending substantially parallel to the first plate, a second connector plate adapted for attachment to a second load carrying member, at least one rectangular aperture in the second plate, said aperture being adequate in size for admitting the hook, and said second plate being adequate in thickness for the first portion of the hook to contact one edge of the aperture and allow the second portion of the hook to overlap the edge of the aperture.

In drawings which illustrate embodiments of the invention,

Figure 1:
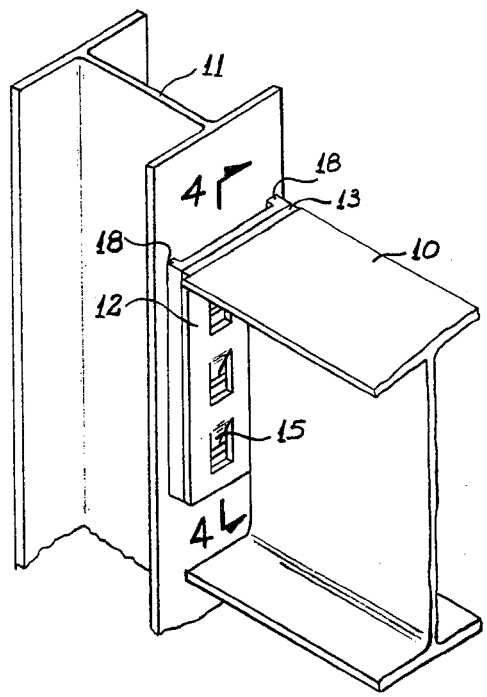
FIG. 1 is a perspective view of a typical structural steel connection employing the connector assembly of the present invention.
Figure 2:
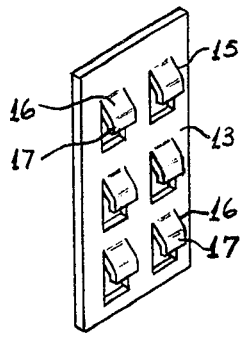
FIG. 2 is a perspective view of one embodiment of one portion of a connector showing the mating surface of a plate having hooks formed therein.
Figure 3:
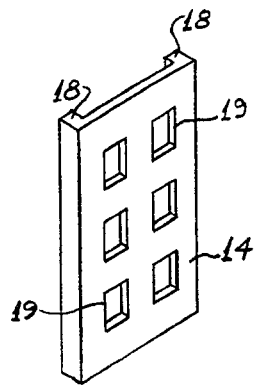
FIG. 3 is a perspective view of a corresponding portion of a connector to that shown in FIG. 2 showing the mating surface of a plate with rectangular apertures therein.

A typical connector assembly is shown in FIG. 1 wherein a structural steel beam 10 is connected to a structural steel column 11 by a connector assembly 12. The connector assembly has a first portion or connector plate 13 rectangular in shape as shown in FIG. 2 sometimes referred to as a male connector plate and a second connector plate 14 as shown in FIG. 3, sometimes referred to as a female connector plate, similar in size and shape to the first plate 13. The first connector plate 13 is welded to the end of the beam 10 and has two vertical rows of hooks 15 or elongated flaps which are pre-punched out of the plate 13. Each hook 15 has a first portion 16 which extends outwards from the plate 13 and a second portion 17 which extends substantially parallel to the first plate 13, in this case downwards from the end of the first portion 16. The second connector plate 14 is preferable bent to form a channel or U-shaped section with two vertical flanges 18. The flanges 18 may also be welded to the second connector plate 14. The second connector plate 14 has two vertical rows of rectangular apertures 19 which are adequate in size to admit the hooks 15 in the first connector plate 13. The two flanges 18 are welded to the face of the column 11. The flanges 18 are thicker than the second portion 17 of the hooks 15, thus the hooks 15 can pass through the apertures 19, and then move downwards so the first portion 16 of the hook 16 rests on the lower edge of the aperture 19, and the second portion 17 of the hook fits between the second plate 14 and the face of the column 11. In the embodiment shown the column 11 is the load bearing member, and thus the load is transferred from the first connector plate 13 to the second connector plate 14. Thus the hook 16 rests on the lower edge of the aperture 19. In some circumstances the load is transferred from the second connector plate to the first connector plate, and the second portion of the hook then extends upwards with the top edge of the aperture resting on the first portion of the hook.

Figure 4:
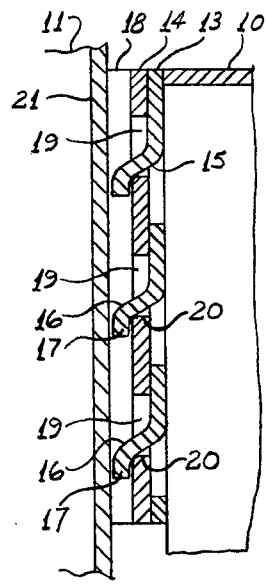
FIG. 4 is a cross-section taken vertically through one line of hooks of the connector assembly shown in FIG. 1 taken at line 4—4.

A cross-section through a vertical row of hooks 15 and apertures 19 from FIG. 1 is shown in FIG. 4. The rectangular apertures 19 in the second connector plate 14 are adequate in size to take the hooks 15 from the first connector plate 13. The hooks 15 have been pushed downwards so that the first portion 16 of each hook rests on the lower edge 20 of the aperture 19. The first portion 16 of the hook 15 has a slope of approximately 45° to the vertical, and the second portion 17 is approximately vertical in the embodiment shown. When in position, the second portion 17 of the hook 15 extends beneath the lower edge 20 of the aperture 19 for a sufficient distance to prevent the hook 15 jumping out of the aperture 19 due to vibrations that may be set up in the framework. Furthermore, if the connector is under a heavy load, the hooks 15 are restrained from bending open by the face of the flange 21 of the column 11 which acts as a restraining plate.

In the embodiment shown in FIGS. 1 to 4 both the first connector plate 13 and the second connector plate 14 are made in long strips with the hooks 15 or the apertures 19 punched at equal intervals along each plate. The strips are cut to the necessary length to form plates with two rows of three hooks. The plates may be made longer or shorter as required thus having more or less hooks. Furthermore, the plate may be split down the centre to form single rows of hooks. In the embodiment shown, the series of hooks are formed from one quarter inch thick plate. The hooks are made in two separate operations. First the two sides and the base of the rectangle are sheared using a punch and die combination to form a flap, the punch having a sloped cutting edge along the sides so that shearing occurs at the base and the sides but not at the top. Secondly, the first and second portions of the hook are pressed out on a bending die giving the hook its final configuration. These two operations are carried out without heating the plate in advance of the punching. In the case of the second connector plate 14, the rectangular apertures 19 are punched out by a regular punch and die combination.

Figure 5:
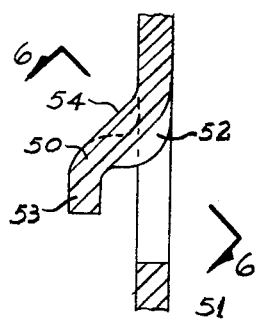
FIG. 5 is a cross-section taken vertically through the centre of a hook of another embodiment of a connector assembly of the present invention.
Figure 6:
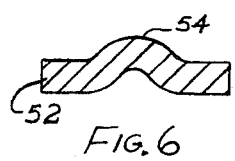
FIG. 6 is a cross-section taken at line 6—6 of FIG. 5.
Figure 7:
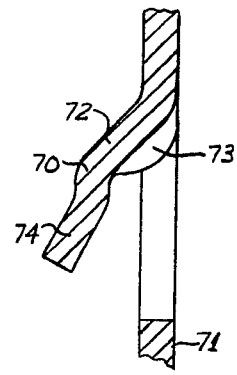
FIG. 7 is a cross-section taken vertically through the centre of a hook of yet another embodiment of a connector assembly.

FIG. 5 shows another configuration of hook assembly which would preferably be formed by hot working. FIG. 6 represents a cross-section through the centre of a hook 50 which is punched from a plate 51. The hook 50 has a first portion 52 and a second portion 53. A stiffener ridge 54 is shown in FIG. 6 at the centre of the hook 50 and provides additional strength for the hook 50 to prevent bending under load conditions. A similar hot worked hook 70 is shown in FIG. 7, with the hook 70 punched from a plate 71 and having a stiffener ridge 72. The hook 70 has a first portion 73 and a second portion 74. The second portion 74 has an outward slope for erection purposes allowing fabrication tolerances and assembly tolerances in the field.

The same configuration of hook assembly as shown in the drawings may be made by forming both the first connector plate and the second connector plate from cast steel. An accurate casting avoids having to machine the cast unit, and produces a strong, cheap connector.

Figure 8:
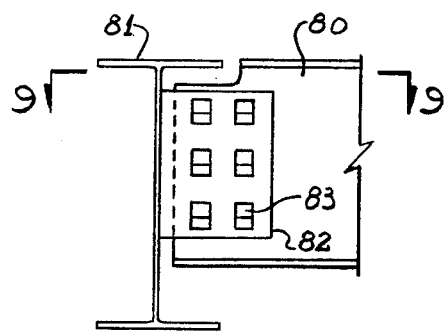
FIG. 8 is a side view of a further embodiment of a connector assembly of the present invention.
Figure 9:
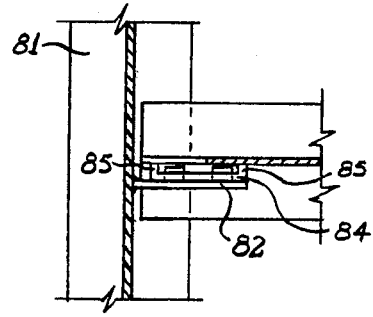
FIG. 9 is a cross-section taken at line 9—9 of FIG. 8.

Another configuration of a connector of the present invention is shown in FIGS. 8 and 9, wherein an intermediate beam 80 is connected to a main beam 81. A first connector plate 82 having hooks 83 therein is welded perpendicular to the web of the main beam 81. The second connector plate 84 has flanges 85 at each side to form a channel shape and is welded to the web of the intermediate beam 80. In this form of connection, the intermediate beam may be assembled by moving it sideways against the first connector plate 82 instead of maneuvering the beam between two opposing first connector plates as shown in the connection of FIGS. 1 to 4. Furthermore, in this configuration the first connector plate 82 has the hook 83 with their second portion extending upwards, the reverse of that shown in FIGS. 1 and 4.

Figure 10:
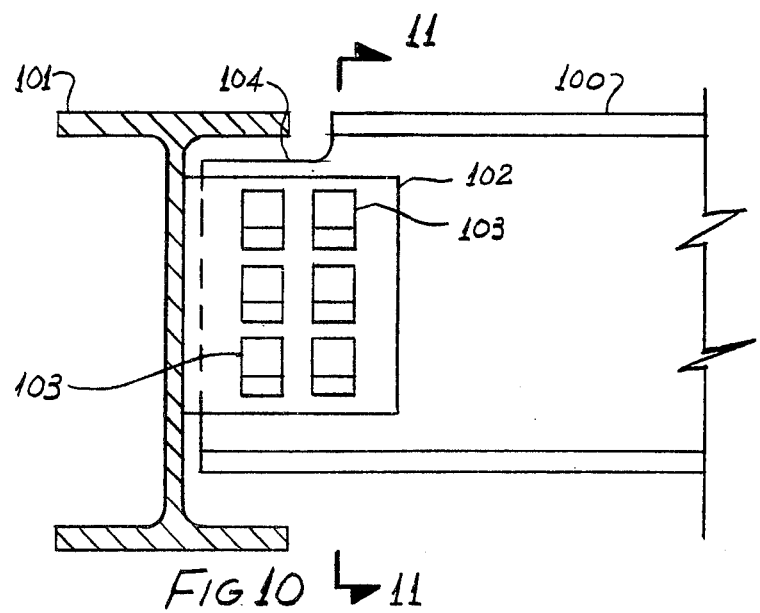
FIG. 10 is a side view of a still further embodiment of a connector assembly of the present invention.
Figure 11:
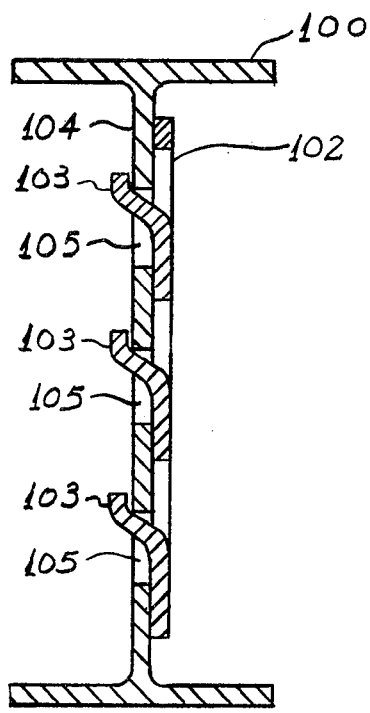
FIG. 11 is a cross-section taken at line 11—11 of FIG. 10.

In some instances, particularly for purlins and intermediate floor joists which do not require heavy loading, a satisfactory connection is produced by making the web of the beam and the second connector plate one. Such an example is shown in FIGS. 10 and 11 where a purlin 100 is joined to a beam 101. A first connector plate 102 having hooks 103 therein is welded perpendicular to the web of the beam 101. The web 104 of the purlin 100 forms the second connector plate, and has rectangular apertures 105 cut therein, preferably by punching. The connection so formed does not have a restraining plate behind the lower portion of the hooks 103, thus the allowable load per hook is reduced.

The channel or U-shaped second connector plate preferred for this invention may be formed from a plate with a flange welded on each side or may be hot rolled or bent in the form of a channel. Alternatively a standard rolled channel section may be used with the tips of the flanges removed.

In the drawings and the description of the invention, reference has only been made to structural steel sections. These include structural steel beams, columns, purlins, roof and floor joists and all other types of load carrying members. However, it will be apparent to those skilled in the art that this connector assembly may be used equally well with concrete or wood, in fact in the case of wood, the first or second connector plates may have nailing strips to attach the plates to a wooden beam. Furthermore, connector plates may be cast into concrete beams or columns or attached to a column by strappling or other means. Furthermore, connectors may be used for joining concrete to steel, concrete to wood or steel to wood. In some embodiments the first connector plate may be tack welded to the second connector plate after assembly to give added protection in preventing the hooks jumping out of their apertures.

EXAMPLE

First connector plates with hooks were prepared from quarter inch steel plate 6 feet long. The plates were cut into strips, 3 inches and 5 inches in width, to make single and double rows of hooks respectively. The hooks were punched out on a shearing punch in a two operation step, the first operation cutting three sides of a rectangular aperture leaving an elongated flap of steel plate, the second operation bending the flap to form a hook configuration as shown in FIG. 4. The vertical spacing of the hooks in a row was set at 3 inches by use of a stop on the punch assembly and the strips were cut into lengths so that three sets of single or double rows of hooks were provided per plate. Similarly for the second connector plate, 3 and 5 inch wide strips of quarter inch thick steel plate were passed through a punch which punched rows of rectangular apertures, with a 3 inch spacing in each row. The spacings between the hooks in the first connector plate and the apertures in the second connector plate were maintained to close tolerances to ensure the load was evenly spread through all the hooks of the connector.

Two main types of connectors were prepared, one type having narrow flanges formed from flats three eighths of an inch thick welded to one side at each edge of the second connector plates with the rectangular apertures therein and these flats in turn welded to a restraining plate which in some cases was the flange or web of a beam. Thus, when the hooks of the first connector plate were inserted into the apertures of the second connector plate, the lower portion of the hooks was restrained from bending outwards by the restraining plates. The second type of connector was similar to the first type but had no restraining plate. The apertures were punched into the load carrying member such as a web or plate. Each hook was 1 inch wide and tests were made to destruction of the two types of connectors. It was found that with six hooks and the first type of connector with a restraining plate, the ultimate load averaged for three tests came to 38,000 lbs. When the tests were carried out on the second type of connector without the restraining plate, it was found that the first and second connector plates tended to separate. Without some form of retaining means to prevent the hooks straightening, it was found that the ultimate load averaged for three tests only just exceeded 20,000 lbs. Thus, it was seen that it is preferred to have a restraining plate in order to achieve maximum loading on the connector.

In conclusion it was found that the governing factors for maximum load capacity was the width of the hooks and the thickness of the connector plates. Therefore the load capacity of the connector may be increased by widening the hooks and consequently the width of the apertures and/or by increasing the thickness of the connector plates. Furthermore, the introduction of a stiffener ridge in the centre of the hook as shown in FIGS. 5, 6 and 7 would also increase the loading capacity for the connector.

The embodiments of the invention in which an exclusive property or privilege is claimed are defined as follows:

1. In a skeleton framework for land static structures including buildings, the improvement of a connector assembly for permanently joining two load carrying structural members together, the connector assembly comprising in combination with the framework:

a first connector plate permanently attached to one load carrying member, said first connector plate comprising at least two vertical rows of a plurality of hooks, each of said hooks formed from an elongated flap punched our from the face of said first connector plate and comprised of a first portion connected to said first connector plate and extending outwards therefrom at an angle approximately 45° to said first connector plate and a terminal second portion extending substantially parallel to said first connector plate;

a second connector plate permanently attached to the other load carrying member, said second connector plate having at least two vertical rows of a plurality of apertures, each of said apertures being adequate in size for admitting the hook and the arrangement and location of apertures corresponding to the arrangement and location of hooks, and said second connector plate having a thickness such that said first portion of said hooks contacts one edge of the coresponding aperture and allows the second portion of said hooks to overlap the edge of the corresponding aperature; and a restraining plate located behind said second connector plate and spaced therefrom a distance greater than the thickness of said second portion of said hook.

2. The connector assembly according to claim 1, wherein the second plate forms the web of a channel section adapted to have the flanges of the channel attached to a flat surface of one of the load carrying members, the distance between the inside face of the web and the tips of the flanges being greater than the thickness of the second portion of the hook, and said restraining plate comprises said flat surface of one of the load carrying members.

3. The connector assembly according to claim 2, wherein the channel section forming the second plate is welded to a structural steel column and the first connector plate is welded to the end of a structural steel beam.

4. The connector assembly according to claim 2, wherein the first plate is welded perpendicularly to the web or a structural steel beam and the channel section forming the second plate is welded to the end of the web of a second structural steel beam.

5. In a skeleton framework for land static structures including buildings, the improvement of a connector assembly for permanently joining two load carrying structural members together, the connector assembly comprising in combination with the framework:

a first connector plate permanently attached to one load carrying member, said first connector plate comprising at least two vertical rows of a plurality of hooks, each of said hooks formed from an elongated flap punched out from the face of said first connector plate and comprised of a first portion connected to said first connector plate and extending outwards therefrom at an angle approximately 45° to said first connector plate and comprising a stiffening ridge extending throughout said first portion and a terminal, second portion extending substantially parallel to said first connector plate; and a second connector plate permanently attached to the other load carrying member, said second connector plate having at least two vertical rows of a plurality of apertures, each of said apertures being adequate in size for admitting the hook and the arrangement and location of apertures corresponding to the arrangement and location of hooks, and said second connector plate having a thickness such that said first portion of said hooks contacts one edge of the corresponding aperture and allows the second portion of said hooks to overlap the edge of the corresponding aperture.

* * * * *